United States Patent [19]
Lane

[11] 3,834,064
[45] Sept. 10, 1974

[54] QUICKLY-COLLAPSIBLE SHELL FISH TRAP

[76] Inventor: Richard T. Lane, P.O. Box 5, Des Allemands, La. 70030

[22] Filed: Jan. 29, 1973

[21] Appl. No.: 327,494

[52] U.S. Cl. .................................................. 43/100
[51] Int. Cl. ........................................... A01k 69/08
[58] Field of Search ............... 43/100, 105, 102, 66

[56] References Cited
UNITED STATES PATENTS

| | | | |
|---|---|---|---|
| 957,618 | 5/1910 | Masek | 43/105 |
| 1,887,059 | 11/1932 | Kraus et al. | 43/105 |
| 2,639,540 | 5/1953 | Buford | 43/102 |
| 3,055,139 | 9/1962 | Condello | 43/102 |

*Primary Examiner*—Warner H. Camp
*Attorney, Agent, or Firm*—C. Emmett Pugh; Calvin J. Laiche

[57] ABSTRACT

A triangularly configured, quickly-collapsible shell fish trap using rigid, peripherally located support rods forming rectangular perimeters for attaching netting mesh thereto, the support rods being formed with loops or hinges at the apex of the triangle for rotation about an axis-rod located laterally at the apex. One of the support rods is provided with a resilient finger latch or trigger formed by a reverse loop which engages an oppositely disposed support rod, thereby providing an easily disengageable means to permit the trap to be placed quickly in use. In one embodiment an open, non-mesh area acts as the entrance for the shell fish.

A modification of the basic trap uses one or two float operated doors which are opened when a shell fish approaches the entrance due to the weight of the shell fish (e.g., a crab) causing the float actuated doors to separate to form an entrance into the trap. After the shell fish enters the trap, the float operated doors close again. This modification also utilizes the resilient trigger means to facilitate erection and collapse of the trap.

8 Claims, 6 Drawing Figures

QUICKLY-COLLAPSIBLE SHELL FISH TRAP

BACKGROUND OF THE INVENTION

The invention relates to an improved collapsible shell fish trap and more specifically to a quick, easy to operate and inexpensive shell fish trap suitable for commercial use. The trap disclosed, because of its complete collapsibility, is easy to store and transport and is extremely light weight.

Some of the outstanding features of this trap is its top-side hinges which enable the user to quickly collapse the trap flat for storage by merely triggering a spring finger latch near the surface of the water while the trap is still submerged or partly submerged, thereby saving time required to remove the trap completely from the water as is the case in most of the shell fish traps presently being used. The simplicity of the finger latch obviates the need for draw strings normally used in connection with more mechanically complex traps presently being used by commercial fishermen. Only lift cords are required in the use of the disclosed trap thereby avoiding time consuming cord entanglement usually encountered with other traps being used. Further, the broad based triangular design reduces the possibility of tilting and overturning caused by undersurface water movements resulting in a tendency of the disclosed trap to sit immovably in its proper upright position on most subsurface terrain.

Various problems are encountered in commercial trapping of shell fish which are overcome by the above mentioned features. For reasons of economy it is necessary that as many traps as possible be transported on a single vessel. The use of the disclosed mechanically simple, light-weight and compact trap has obvious advantages over the more complex, bulky and heavy prior art traps. Another factor to be contended with is the tidal influence on some shell fish which limits the times during which they may be caught. It becomes readily apparent that time becomes valuable when setting up many traps as well as having to remove them periodically due to poor trapping in a given location. Thus, when it is considered that a hundred or more traps are used at a time, the advantage of the instant quickly-collapsed trap becomes apparent.

A modified version of the quickly-collapsible trap is disclosed which has been found to be more suitable for use with certain types and sizes of shell fish as well as other environmental factors which may be present. Although this modification has features identical to the first trap disclosed, namely, top-sided hinges and finger-latch, it has the additional feature of a float operated door which precludes the shell fish from escaping once in the trap.

It is therefore an object of the invention to provide a quickly-collapsible shell trap suitable for commercial use.

Another object of the invention is to provide a triangular shell fish trap which is inexpensive to make, simple and quick to operate by means of a simple finger latch, thereby substantially reducing labor cost in the large scale manufacture and utilization of same on commercial vessels.

Still another object of the invention is to provide a compact, light weight shell fish trap which is suitable for use in large numbers on small commercial vessels without taking undue space needed for the shell fish caught.

Yet another object of the invention is to provide a triangular quickly-collapsible shell fish trap which has a float operated entrance door that closes after each shell fish enters.

Other objects, features and advantages of the invention will be apparent from the following detailed disclosure, taken in conjunction with the accompanying drawings, wherein like reference numerals refer to like parts.

BRIEF DESCRIPTION OF THE DRAWINGS

For a better understanding of the nature and objects of the invention, reference should be had to the following detailed description, taken in conjunction with the accompanying drawings, in which like parts are given like reference numerals and wherein.

DETAILED DESCRIPTION OF PREFERRED EMBODIMENTS

Figure 1:
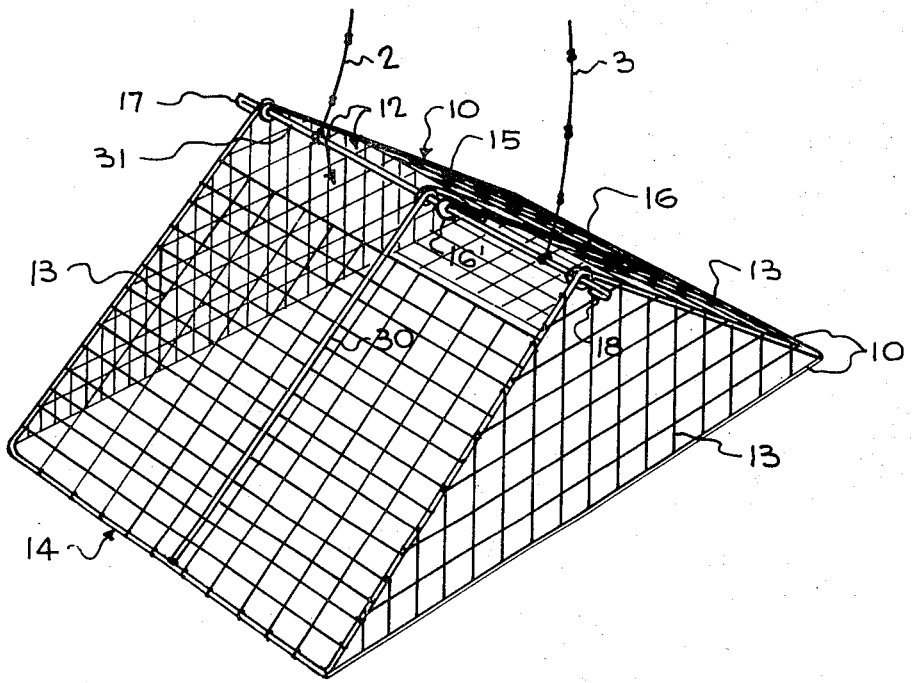
FIG. 1 is a perspective view of a first embodiment of the invention shown in its erected position.

Referring now to the drawings and more specifically to FIG. 1, the triangular, quickly-collapsible shell fish trap is shown in its non-collapsed or erected position.

A rigid rod 14 forms an inclined, U-shaped perimeter or frame acting as one support leg or side of the triangular trap. The open side of the U-shaped perimeter is closed by lateral axis rod 31 which also forms the remaining or fourth side of opposing, inclined, U-shaped member 10. The frame members 10, 14 with lateral rod 31 thus define two quadrangles with a common side. The frame members 10, 14 are covered with a mesh material 13.

The U-shaped frame members 10, 14 have loop bends 10', 14' at their ends which loop around the axis rod 31 and allow rotation of the frame members 10, 14 about the axis rod 31.

Axis rod 31 has bent-back stops 17 and 18 at each of its ends to prevent either U-shaped members 14 and 10 from sliding off and becoming disengaged from it.

Two central support and locking rods 16, 30 are provided as part of the frame members 10, 14, respectively, and are welded or otherwise fixedly attached to the frame members 10, 14, respectively, at their lower ends.

Figure 6:
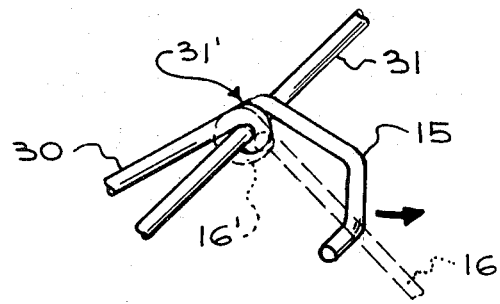
FIG. 6 is an enlarged view of the trigger latch used in all embodiments of the present invention.

The central support rod 30 has the other of its ends looped around rod 31 near its center and extends to the other side to form a spring trigger or latch 15 (shown in more detail in FIG. 6) to mate with central rod 16, the latter also being looped at its end for rotatable motion about axis rod 31. The spring latch 15, which forms a lateral hook, engages underneath the rod 16 and forceably biases it out (note arrow) and against the restraint of the mesh material 13 and holds the trap in its erected position. The material for the latch 15 must have a certain degree of springiness or resiliency, and typically six gauge steel wire for a trap 16 inches by 10 inches when folded (as in FIG. 2) has been found to be suitable for latch 15 as well as for all the frame, support and rod members (10, 14, 16, 30, 31). It is noted that there are no horizontal frame or support members, extending across the bottom of the trap, leaving it completely open structurally except for the pliable mesh material 13. Because the hinge portion 31' of central rod 30 is merely looped around axis rod 31, it provides the spring latch or hook 15 with slideable motion, further facilitating the easy disengageability of the latch 15.

The shell fish, e.g., crabs, enter into the trap through the open spaces 12 adjacent and on either sides of the axis rod 31 and, once they enter, are generally trapped within the confines of the supported mesh structure 13. As illustrated all sides of the triangular trap are covered with a suitable net or mesh 13, such as string net or screen mesh, to prevent the entrapped shell fish from escaping once it enters through opening 12.

As depicted in FIG. 1, all hinges (10', 14', 16', 30') and the latch means 15 are located at or adjacent to the top or apex of the triangular shell fish trap, thereby facilitating the setting up and collapsing of the trap. Lift lines 2 and 3 are used for raising and lowering the traps into position.

Figure 2:
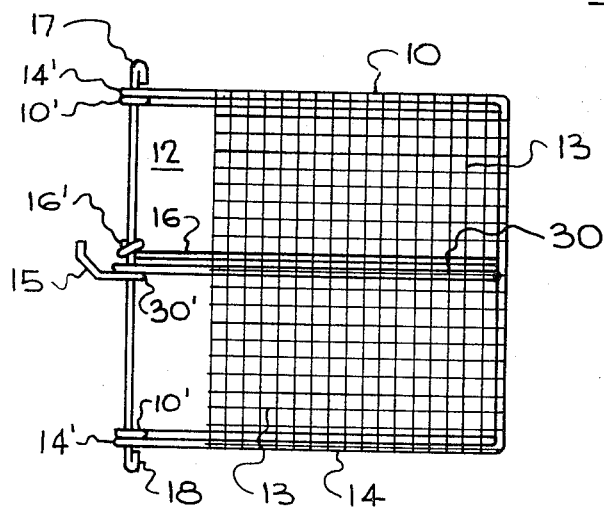
FIG. 2 is a perspective view of the trap of FIG. 1 in a collapsed, flat position.

FIG. 2 shows the trap in its collapsed configuration with spring trigger or latch 15 disengaged with respect to rod 16. To disengage the latch 15, it is merely depressed by the finger and pushed away from the rod 16, then allowed to spring out of engagement. In the collapsed position the two U-shaped perimeters of frame members 10, 14 fold flat back onto themselves about the axis rod 31 for higly compact storage.

Figure 3:
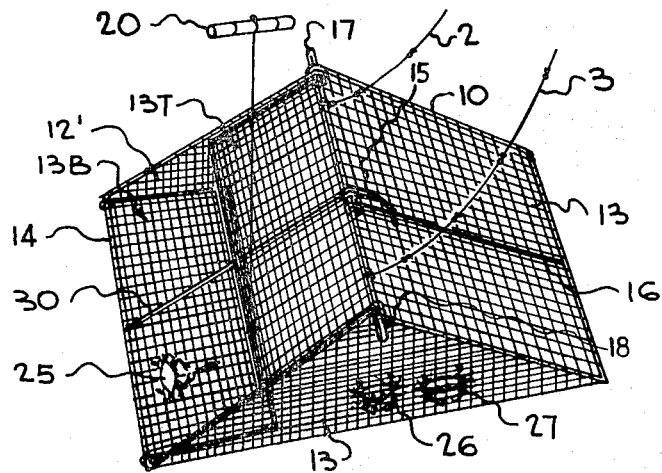
FIG. 3 is a perspective view of a modification of the present invention shown in an erected position with the entrance door opened.
Figure 4:
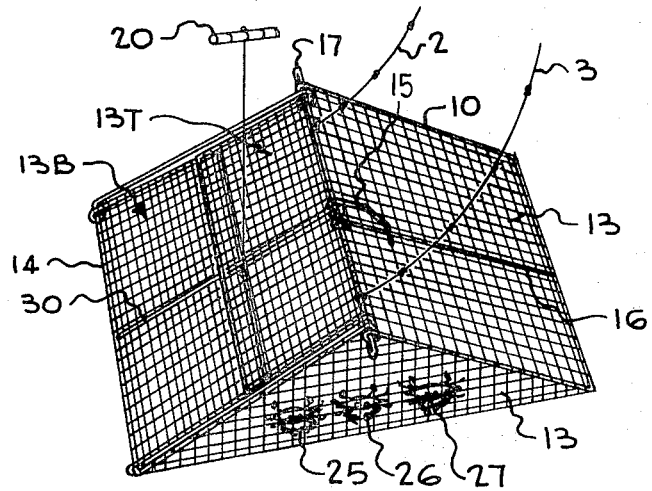
FIG. 4 shows the same embodiment of FIG. 3 having the entrance door closed.

Turning now to FIGS. 3 and 4, a modified version of the trap is shown having a float operative entrance door 13B instead of the openings 12.

First, FIG. 3 shows the entrance or trap door 13B open leaving an entrance space area 12'. As the shell fish 25 crawls onto the trap door 13B drawn by the internal bait, float 20 is pulled down because of the added weight, thereby permitting the trap door to fall toward the subterrain surface under the influence of gravity. Upper trap door 13T stays in its same position resting on top of central support rod 30. Once the shell fish 25 is in the trap, it falls or swims to the bottom with the other entrapped shell fish 26 and 27, and trap door 13B is pulled up by the buoyancy of float 20, returning to its normally closed position, as shown in FIG. 4. Having the auxillary trap door 13T allows for easier access into the trap on the surface for removal of the catch.

The modification or second embodiment shown in FIGS. 3 and 4 has all of the same basic, structural features of the trap shown in FIGS. 1 and 2, including the top-side hinges 10', 14' of U-shaped frame members 10, 14. As above, finger spring latch 15 formed at an end of support rod 30 is engageable under resilient tension with support rod 16 to provide a ready means of setting up and collapsing the trap for ease in storing and transporting the traps. Axis rod 31 also acts as the pivot for the hinged or looped section 16', 30' of central support rods 16, 30, as well as for U-shaped members 10 and 14. The trap is completely covered by a mesh material 13 to prevent entrapped shell fish from escaping. Lift cords 2 and 3 are provided for raising and lowering the trap into position.

Figure 5:
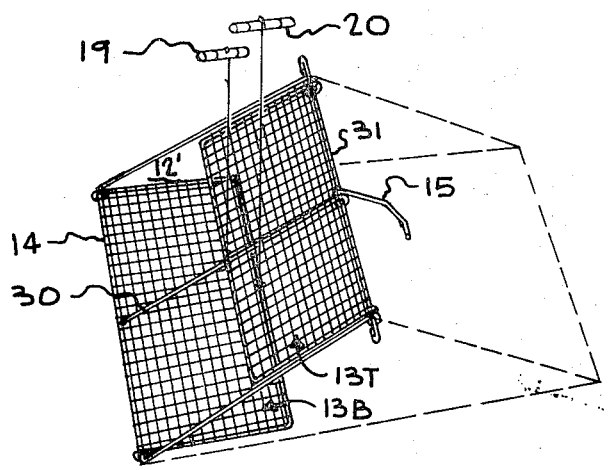
FIG. 5 is a perspective view of an alternative embodiment of the invention as shown in FIGS. 3-4 using two floats.

In FIG. 5, a further modified version of the trap is shown having both upper and lower trap doors 13B, 13T actuated by floats 19, 20. The operation of this version of the shell fish trap is identical to the modification shown in FIGS. 3 and 4 except that the top trap door 13T is held in position by the buoyant action of float 19 which acts to pull trap door 13T upward against rod support 30. In this embodiment, the trap door 13T is under central rod support 30, whereas it was above the central rod support 30 in the embodiment shown in FIGS. 3 and 4. This modification of the trap is useful in environments where the subsurface water currents are strong or turbulent. The use of the second float 19 on trap door 13T exerts a substantially constant upward force on trap door 13T to insure a clean break between it and trap door 13B when the latter is weighted down by the presence of a shell fish, and yet, by being positioned under the central rod 30, it can not be flushed open by a strong current as would be possible in the embodiment of FIGS. 3–4.

The other structural features of this third embodiment of the trap are identical to the second embodiment shown in FIGS. 3 and 4 and discussed in connection therewith. Although only one side 14 of the trap is shown with a trap door opening in the embodiments of FIGS. 3–4 and FIG. 5, an additional trap door may of course be provided as part of the other U-shaped member, if desired.

Although peripheral wire frames are shown for the trap doors 13B, 13T, in the embodiments of FIGS. 3–5, such additional wiring has been found to be not absolutely necessary. For a structurally simpler and cheaper version, such trap door frame members can be eliminated with the mesh or netting just loosely attached to the basic structure of the trap.

The frame members 10, 14, 16, 30 and 31 can be made of steel wire or made of plastic, as long as it has the requisite strength to withstand use and sufficient springiness or resiliency for spring latch member 15 to properly work to lock the frame in its erected position. For greater resistance to corrosion the frame could also be made of stainless steel.

As is apparent from the foregoing, the trap of the present invention can be easily fabricated and is non-critical in its alignment and mating of parts, relative motion between most elements being allowed by the simple loose loop hinge connections used.

Because many varying and different embodiments may be made within the scope of the inventive concept herein taught, and because many modifications may be made in the embodiments herein detailed in accordance with the descriptive requirements of the law, it is to be undersood that the details herein are to be interpreted as illustrative only and not in a limiting sense.

What is claimed as invention is:
1. A completely collapsible shell fish trap comprising:

first and second, adjacent, rigid frame support members, each defining a quadrangle and sharing a common side, for supporting mesh material to define an enclosed trap chamber having a triangular cross-section, said common side forming the apex of the triangle;

a transverse axis hinge rod forming said common side, each of said two frame support members being hingedly connected to said axis rod for rotational movement toward each other about said axis rod for folding said frame support members flat against each other;

disengageable spring latch means associated with said axis hinge rod and one of said frame supports for permitting said two frame supports to fold flat against each other when said spring latch is disengaged, and when said spring latch is engaged acting to cause said frame supports to be held under pressure in an upright position thereby forming the triangular shaped shell fish trap;

entrance means located in the trap for allowing entry of the shell fish into the trap; and mesh material covering at least substantially all of the entire trap.

2. The shell fish trap of claim 1 wherein said frame support members comprise U-shaped, rigid support rods each having their respective open sides directly facing each other; and a first central rod lying perpendicular to said axis rod and being hingedly connected to said axis rod at or about its approximate midpoint at one end, the other end of said first central rod being fixedly attached to said first U-shaped member.

3. The shell fish trap of claim 2 wherein there is further included:

a second central rod lying perpendicular to said axis rod and hingedly connected to said axis rod at or about its approximate midpoint at one end, the other end of said second central rod being fixedly attached to said second U-shaped member;

said spring latch means being a lateral hook integrally formed with said second central rod near its hinged end and releaseably engageable under pressure with said first central rod to provide forceable support to both said U-shaped members when said latch is engaged, and, when disengaged, said latch allowing said U-shaped members to collapse with respect to each other.

4. The shell fish trap of claim 2 wherein:

said disengageable latch means is formed of a hook having a bias or spring action upwards with respect to said first central rod, and there is further included a second central rod lying perpendicular to said axis rod and hingedly connected to said axis rod at or about its approximate midpoint at one end, the other end of said second central rod being fixedly attached to said second U-shaped member, the hinged section of said second central rod providing said disengageable spring latch with slideable motion along said axis rod, thereby facilitating the disengageability of said latch means.

5. The shell fish trap of claim 1 wherein said entrance means is formed by said mesh material not extending to said axis rod, leaving a rectangular uncovered area adjacent said axis rod, thereby providing the entrance into said triangular trap.

6. The shell fish trap of claim 1 wherein said entrance means comprises:

a mesh covered trap door hingedly connected to one of said U-shaped members at its parallel non-axis side, said trap door being operable beneath one of said central rods; and float means attached to said trap door for buoyantly maintaining said trap door when in a closed position but allowing said trap door to open when a shell fish crawls upon it.

7. The shell fish trap of claim 6 further including:

a second trap door hingedly connected to the same one of said U-shaped members, said second trap door being located above said central rod and remaining in a normally closed position due to the effects of gravity resulting from its own weight.

8. The shell fish trap of claim 6 further including:

a second trap door hingedly connected to the same one of said U-shaped members, said second trap door being located below said central rod; and float means attached to said second trap door acting to pull said second trap door up against said central rod to maintain it in a normally closed position.

* * * * *